INVENTOR.
BRUNO ZILLIE
BY
R. G. Story
ATTORNEY

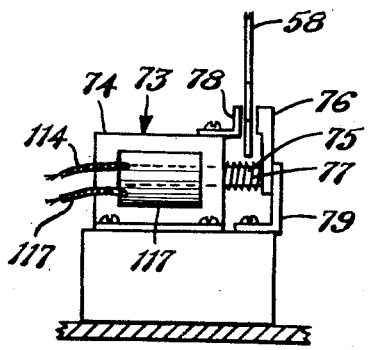
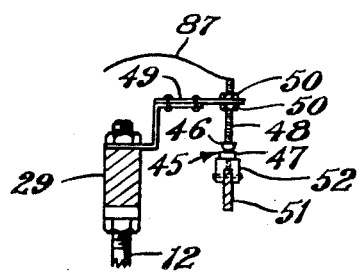

United States Patent Office 2,812,705
Patented Nov. 12, 1957

2,812,705

ELECTRICAL CONTROLS FOR HAM PUMPING

Bruno Zillie, Calgary, Alberta, Canada, assignor to Swift & Company, Chicago, Ill., a corporation of Illinois Application November 14, 1956, Serial No. 622,107

9 Claims. (Cl. 99—256)

The present invention relates to an apparatus for controlling the amount of additives of material to product on a scale as a function of the initial weight of the product on the scale. More specifically, the apparatus is for use in controlling the amount of pickle or the like to be added to a cut of meat such as a ham.

It is the practice in the packing industry to add pickle, or liquid curing material, to cuts of meat in an amount determined by the weight of the cut of meat before the pickle is added. For example, in the processing of hams a ham is weighed, needles or other hose connections are placed in communication with the veins in the ham, and an amount of pickle is pumped through the needles into the ham. The amount, by weight, of pickle pumped will be a predetermined percentage, e. g. 10%, of the initial weight of the ham. Numerous automatic scales and scale attachments have been devised in the past for performing this operation. However, in the main these are expensive and complicated pieces of apparatus. The principal object of the present invention is to provide a device which may be incorporated into a scale either at the time that the scale is manufactured or as an attachment to an existing scale which is simple and low in cost, yet which will control the amount of pickle pumped into the ham as a function of the initial weight of the ham. In addition to being simple, the apparatus that I have devised is of such a nature that it can be maintained by the individual who regularly services the scales, inasmuch as the mechanism incorporates only parts that are standard, readily purchased, parts, or parts that are of a nature as to be readily understandable to a scale man. It is particularly suitable for adaption of existing scales, thus salvaging the capital investment that many meat packers already have therein. The electrical controls do not utilize wiping contacts with their attendant disadvantages of failure of electrical contact and the loading of the scale mechanism.

Other objects and advantages will become apparent from the following description taken in conjunction with the drawings in which:

Figure 2 is a schematic wiring diagram;

Figure 3 is an enlarged partial plan view as seen along line 3—3 of Figure 1;

Figure 4 is an enlarged section taken at line 4—4 of Figure 1;

Figure 1:
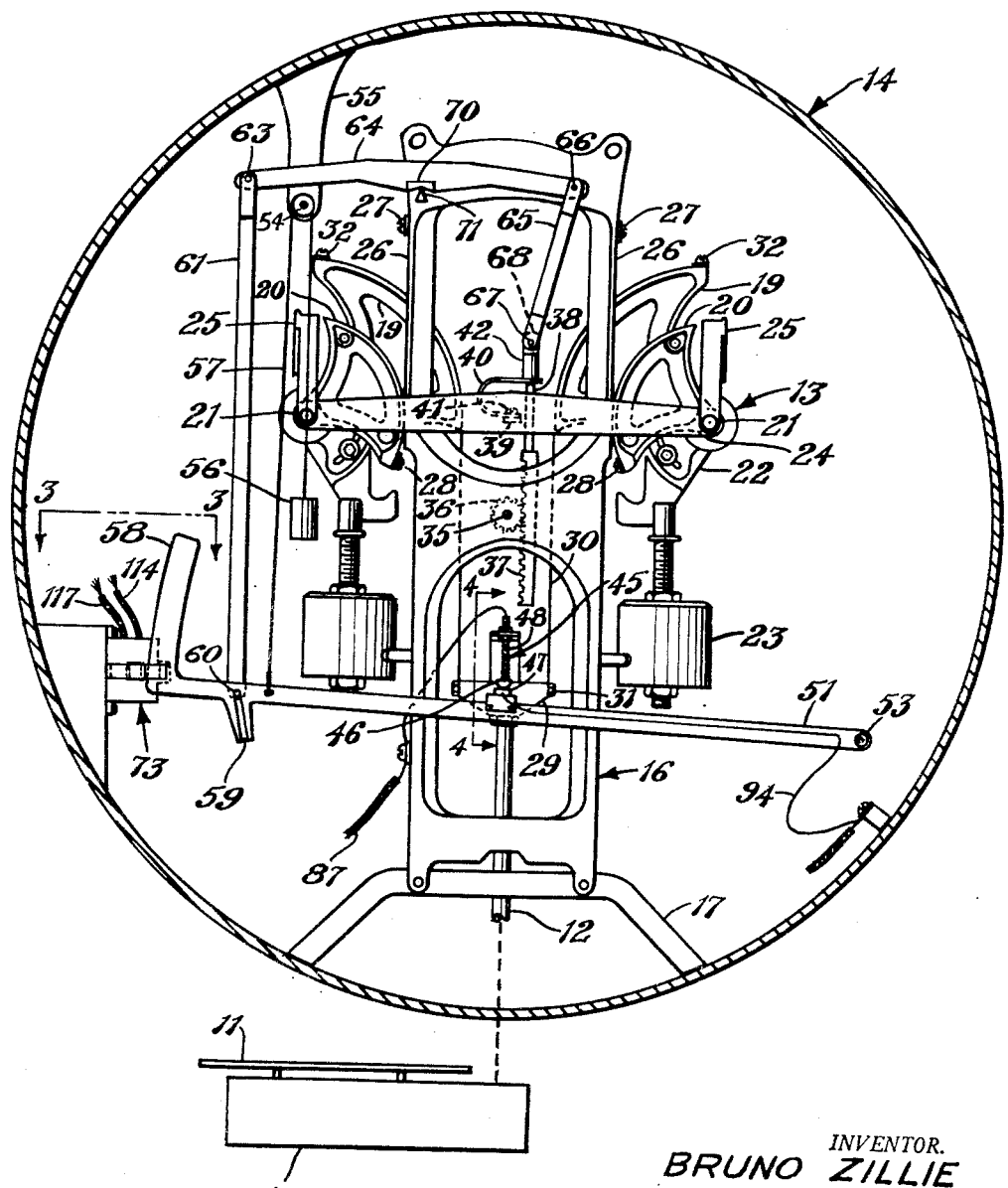
Figure 1 is a side elevation of the counterbalance action of the mechanism of a dial scale, illustrating the incorporation of an embodiment of the present invention therein.

The scale mechanism illustrated in Figure 1 is of a type commonly known as a floating balance scale. One such scale has been produced by the Toledo Scale Company as a Toledo 31-0850 type scale. Illustrated diagrammatically in Figure 1 is the lower case 10, which houses the lever mechanism on which is carried the platform 11 for supporting the product. The lever mechanism within case 10 is connected by a rod 12 to the floating balance generally 13 mounted in a cylindrical housing generally 14 which forms the frame for the floating balance. The frame includes a central column 16, sometimes designated a sector guide, which is attached to the case at the top thereof and to the bottom through a mounting bracket 17.

The floating balance 13 comprises a power sector 19 and a fulcrum sector 20, each attached to a shaft or pin 21. Similarly attached to shaft 21 is an arm 22 on which is mounted a counterweight 23. As is well-known in the art, this mounting of counterweight 23 involves various adjustable features so as to permit the calibrating of the scale. It will be noted in Figure 1 that the sectors and counterbalance structure are duplicated on each side of sector guide 16, with the pins 21 on each side being connected by a pair of compensating bars 24 in which the pins 21 are journaled. A yoke 25 connects each end of each pin 21.

The balance 13 is supported by a fulcrum sector ribbon 26 attached at one end to sector guide 16 by means of a screw 27 and attached at the other end by a screw 28 to fulcrum sector 20. The fulcrum sectors 20 ride against the sides of sector guides 16 with the sector ribbon 26 being interposed therebetween. On the upper end of rod 12 is a ribbon connection yoke 29 to which is secured a power ribbon 30 by means of a bolt 31. The other end of ribbon 30 is secured to the power sector 19 by means of a screw 32.

A shaft 35 is suitably journaled in case 14 with one end of the shaft carrying a pointer, not shown, traveling about the weight indications on a dial, not shown. Also secured to shaft 35 is a pinion 36 which is engaged by a rack 37 on a rod 38. Rack 37 is mounted in suitable guides, not shown. A flexible member 40 has the ends thereof secured at one end to cross member 39 by a screw 41 and at the other end to a cylinder 42 attached to rod 38.

The scale thus far described, i. e. elements 10 through 42, is a standard scale structure, which structure was not invented by me nor was the structure modified (insofar as its operation is concerned) in incorporating my invention therein.

My control apparatus includes an electrical switch generally 45 consisting of two contacts 46 and 47 suitably insulated from the frame. Contact 46 is attached to the end of a threaded bolt 48 passing through an opening in one end of a mounting bracket 49 and held in place by a pair of nuts 50. The other end of mounting bracket 49 is secured to yoke 29 (best seen in Figure 4).

Contact 47 is attached to an arm 51 by means of a bracket 52. Arm 51 is pivotally mounted on a pin 53 secured to case 14. A pulley 54 is supported by member 55 attached to case 14. A counterweight 56 is attached to arm 51 by means of a cord 57. Adjacent finger 58 is a slot 59 in arm 51 with the upper end of the slot being closed. A headed pin 60 is attached to a connecting member 61 and projects outwardly therefrom, being received in slot 59. A pin 63 at the other end of connecting member 61 pivotally connects member 61 with an arm member 64. Arm member 64 is connected to rod 38 by a connecting member 65 pivotally secured at one end to arm 64 by a pin 66 and at the other end by a pin 67 to a bracket 68 secured to cylinder 42. A bearing 70 in arm 64 supports the arm on a knife edge 71 attached to sector guide 16.

Figure 3 illustrates the electrically actuated clamp member generally 73 for fixedly positioning arm 51. Clamp member 73 comprises a solenoid 74 having an armature 75. Armature 75 has an arm 76 attached to the end thereof with the armature being urged outwardly by a spring 77 between arm 76 and the frame of the solenoid 74. Arm 76 forms one end of the clamp with the other end being formed by a bracket 78 attached to the solenoid frame. As will be noted in Figure 3, finger 58 passes between bracket 78 and arm 76. A stop 79 limits the extent of outward travel of the armature 75.

Referring to Figure 2, a pair of power lines 80 and 81 are connected to a suitable source of electrical power through a switch 82 and fuses 83. A stepdown transformer 84 has the primary winding 85 thereof connected to lines 80 and 81. One side of the low voltage secondary winding 86 is connected by a wire 87 to contact 46 of switch 45. The other side of secondary 86 is connected by a wire 88 to one of the normally opened contacts 89 of a relay generally 90. The other of the normally open contacts 89 is connected by a wire 91 to the solenoid 92 of a normally closed relay generally 93. The other side of solenoid 92 is connected to contact 47 of switch 45 by a wire 94. One of normally closed contacts 98 of relay 93 is connected to power line 81 by a wire 99, while the other normally closed contact is connected by a wire 100 to one side of solenoid 101 of relay 90. A wire 102 connects the other side of solenoid 101 with one end of solenoid 103 of normally opened relay generally 104, one end of solenoid 106 of a normally open switch 107 (which switch is held closed upon solenoid 106 being energized), one side of light 105, and with one of the contacts 108 of switch 107. The other side of light 105, the solenoid 103 of relay 104 and the other side of solenoid 106 of switch 107 are connected to wire 100. The other of the normally opened contacts 108 of switch 107 is connected by a wire 109 to one side of a normally closed switch 110. The other side of normally closed switch 110 is connected to line 80 by a wire 111. One of the normally open contacts 112 of relay 104 is connected to line 80 by a wire 113, while the other of the normally opened contacts 112 is connected by a wire 114 to one side of solenoid 74 of clamping member 73 and to one side of an actuating solenoid 115 of a normally closed valve generally 116. The other sides of solenoids 74 and 115 are connected to line 81 by wires 117 and 118, respectively. One side of valve 116 communicates through a pipe 119 to a suitable source of pickling fluid, while the other side connects through a hose 120 to an injection needle 121. A condenser 122 is connected across switch 45 to reduce arcing across the contacts thereof.

The operation of the device is as follows:

Switch 45 is adjusted to close at zero weight. Switch 82 is closed to energize the control mechanism and a cut of meat with the needle 121 in place in the cut of meat is placed on platform 11. The weight of the cut of meat pulls rod 12 downwardly causing the rotation of power sectors 19. The rotation of power sectors 19 rotates fulcrum sectors 20, winding ribbon 26 about the sectors so as to raise the floating balance 13. The raising of the floating balance 13 raises rack 37 to rotate gear 36 and indicate the weight on the dial of the scale. So far this is the normal operation of the scale. In addition, as rod 12 went down, yoke 29 also went down moving contact 46 of switch 45 down. At the same time as rack 37 moved upwardly, connecting member 65 also moved up, lowering connecting member 61 and allowing arm 51 to pivot downwardly. The proportions of arm 64 each side of knife 71, together with the length of arm 51 between pivot point 56 and pin 60 and the positioning of contact 47 on arm 51 is such that contact 47 moves downwardly an amount greater than the movement of contact 46, which amount bears the same relationship to the movement of contact 46 as the percentage of pickle that is desired to be pumped into the meat product (as measured by weight) bears to the weight of the meat product without the pickle therein.

The scale having come to rest, the operator then manually closes switch 107. This completes a circuit through solenoid 106 to hold switch 107 closed and completes a circuit through light 105 to indicate that pickle is being pumped. At the same time it creates a circuit through solenoid 103 of relay 104 to energize solenoid 74 of locking mechanism 73. This pulls in the armature 75 of locking mechanism 73 to clamp finger 58 between bracket 78 and arm 76 on the end of solenoid 75. This locks arm 51 in place. The closing of relay 104 simultaneously energizes solenoid 115 of valve 116 to commence the flow of pickle from pipe 119 to the injection needle 121.

The closing of switch 107 also energizes coil 101 of relay 90 to produce a circuit from transformer 84 through contacts 89, solenoid 92 of relay 93 to contacts 46 and 47. Since contacts 46 and 47 at this time are open, as previously described, the circuit from transformer 84 is not complete. With the addition of pickle to the meat the weight of the meat increases moving rod 12 a further distance downwardly and at the same time moving rack 37 upwardly. However, since finger 58 of arm 51 is locked there is no further movement of arm 51. The further pivoting of arm 64, in a counterclockwise direction as viewed in Figure 1, only serves to move pin 60 downwardly in slot 59. As rod 12 continues to move down, and along with it contact 46, contact 46 approaches contact 47 and upon reaching contact 47 the circuit from transformer 84 is completed.

The completed circuit through switch 45 (contacts 46 and 47) energizes solenoid 92 of relay 93 to open contacts 98 breaking the circuit through the light, through the holding solenoid 106 and through solenoid 103 of relay 104. Switch 107 opens as does the circuit through the contacts 112 of relay 104, allowing valve 116 to close and releasing the grip that clamping member 73 had on finger 58. Thus the flow of pickle is stopped and the scale is ready for the meat with the injected pickle to be removed and a new cut of meat placed thereon. Switch 110 is used to stop the operation of the control mechanism should that be desired.

Figure 5:
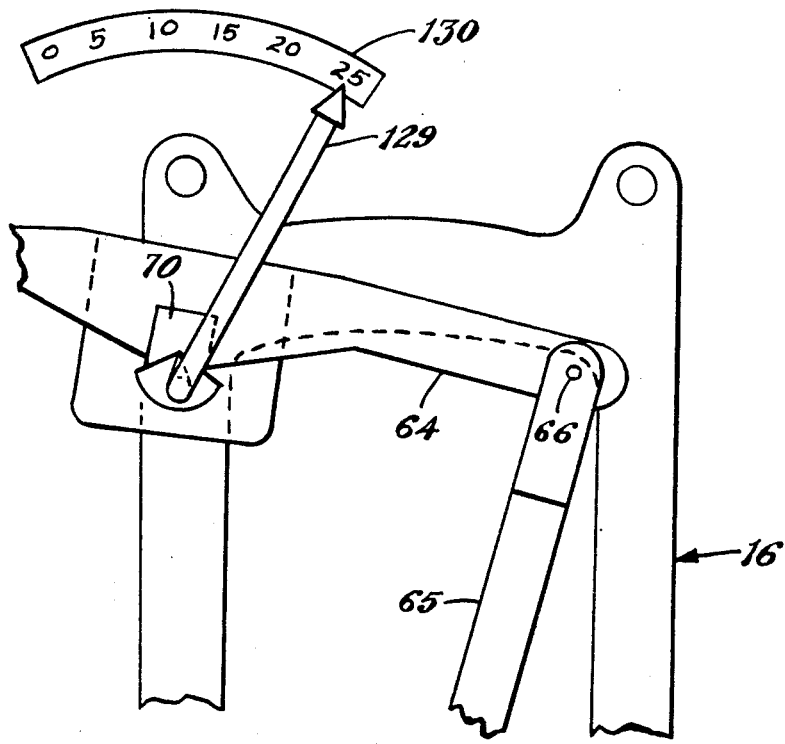
Figure 5 is a partial elevation of the invention illustrating an alternative mounting of the knife edge to obtain adjustability in the amount of pickle pumped.
Figure 6:
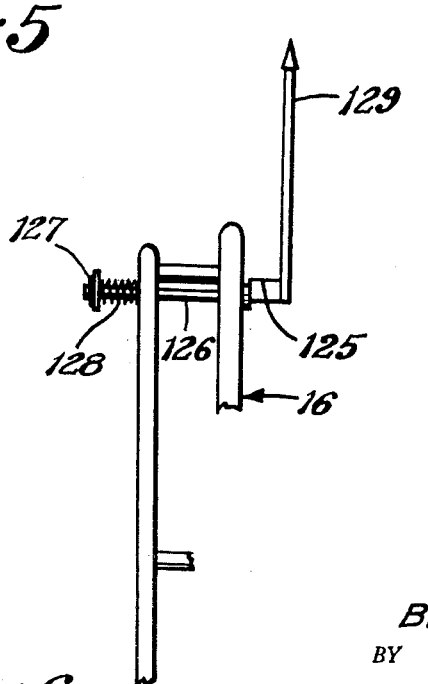
Figure 6 is a side view of the knife edge mounting of Figure 5.

Figures 5 and 6 illustrate a modification of the previously described embodiment to permit adjustment of the percent of pickle pumped into a meat. In this embodiment the bearing 70 for arm 64 is mounted on a pivotable knife edge. The knife edge 125 is mounted on a shaft 126 rotatably supported by sector guide 16. A "C" washer 127, fitting in a slot at the opposite end of the shaft 126 holds a spring 128 between the washer and the back side of sector guide 16. An indicator and adjustment arm 129 is attached to shaft 126 and is used in conjunction with a scale 130 to indicate the percentage of pickle to be pumped.

A specific embodiment of such a device which will control the addition of 5–25% of pickle to a ham, which embodiment is mounted on a scale manufactured by Toledo Scale Company, identified by their style No. 0861, is as follows:

The length of arm 51 from the center of pivot 53 to the upper end of slot 59 is $11\frac{11}{16}$ inches, while the total length of the arm from the pivot point to the side of finger 58 furthermost from the pivot point is 14 inches. This arm is counter-weighted to the extent that the top of slot 59 will just barely ride on pin 60. The center to center distance from pin 60 to pin 63 is $8\frac{13}{16}$ inches and the distance from pin 63 to pin 66 is $6\frac{7}{16}$ inches. Knife edge 71 contacts arm 64 a distance of $3\frac{1}{16}$ inches from the center of pin 66. The top of knife edge 125 is $\frac{3}{32}$ of an inch below a straight line between pin 63 and pin 66.

As in the previous embodiment, the switch 45 is adjusted to close at zero weight. The dial 130 may be then calibrated by putting a 10 pound weight on the scale platform. The arm 51 is then locked in place by starting switch 107 (the pickle supply is, of course, disconnected or otherwise rendered inoperative). A half pound weight is put on the scale and shaft 126 is rotated by means of arm 129 until the switch 45 just closes. This is the 5% point on scale 130. Another half pound weight is added (making the total addition of one pound) and arm 129 again moved until switch 45 closes. This is the 10% point on scale 130. The remainder of the scale may be similarly calibrated. The weights are removed (and pickle again provided) whereupon the scale is ready to use. For any desired amount of pickle arm 129 is moved until the pointer registers the desired percentage of pickle on scale 130. Thereafter the operation of the apparatus is as previously described with respect to Figures 1 through 4.

The foregoing description of a specific embodiment is for the purpose of complying with 35 U. S. C. 112 and should not be construed as imposing unnecessary limitations on the appended claims inasmuch as various modifications will be apparent to those skilled in the art. For example, instead of using the fixed mounting of contact 46, this contact might be spring mounted to bracket 49. One or more clamps or other means for supplying the liquid material to the cut of meat or the like might be used depending upon the application involved. The needle shown at 121 is for the purpose of illustration only. The slot 59 and pin 60 on elements 51 and 61, respectively, might be reversed as to the elements of which they form a part. The form of counterweight shown in Figure 1 might be supplanted by other well-known counter-balance means. For applications requiring extreme accuracy the use of a lever such as that shown at 64 and the allowing of arm 53 to bear slightly on that lever during a portion of the cycle might introduce sufficient error to not justify the use of the present invention. However, in an application such as the injecting of pickle into hams the required accuracy is more than enough to permit the use of the present invention. In the embodiments discussed the range of error is in the neighborhood of 0.104% of dial capacity on a 30# scale. As a matter of fact, the usual errors incurred by reason of manual operation are far greater than the amount of error introduced by following the present invention.

I claim:

1. An apparatus for adding an amount of one substance to a second substance wherein the amount to be added is a percentage of the weight of the second substance, said apparatus including a scale having a load bearing means and means movable in response to changes of weight on the load bearing means, supply means for said one substance including a substance transfer means to add the one substance to the second substance, and regulating means to control the amount of said one substance added by said transfer means to said second substance, said regulating means including a first electrical contact connected to said movable means, lever means normally operatively connected to said movable means, a second electrical contact on a portion of said lever means in alignment with said first contact, said lever means being constructed and arranged so that the movement of one of said contacts is a predetermined percentage greater than the movement of the other of the contacts in response to a weight being placed on said bearing means, and means to disconnect said portion of said lever means from movement in response to movement of the movable means.

2. An apparatus for adding an amount of one substance to a second substance wherein the amount to be added is a percentage of the weight of the second substance, said apparatus including a scale having a load bearing means, a first member movable in a given direction in proportion to the weight on the scale load bearing means, and a second member movable in proportion to the weight on the scale load bearing means; supply means for said one substance including substance transfer means to add the one substance to the second substance; and regulating means to control the amount of said one substance added by said transfer means to said second substance, said regulating means comprising a first electrical contact connected to said first member, a pivotally mounted lever arm, a second electrical contact on said arm, said arm being positioned in alignment with said first contact with said second contact in said direction from said first contact, lever means having a stop thereon and connected to said second member for movement thereby, said arm normally being urged against said stop in a direction such that without said urging said stop will move out of contact with said arm upon an increase in weight on the scale load bearing means whereby said second contact will normally move in response to movement of said second member, and means to arrest the movement of said arm whereby an increase in weight on said load bearing means will not result in movement of said second contact.

3. An apparatus for adding an amount of fluid to a meat cut wherein the amount of fluid is a percentage of the weight of the cut, said apparatus including a scale having a scale platform, a first member movable in proportion to the weight on the scale platform and a second member movable in proportion to the weight on the scale platform; fluid injection means including a fluid conduit and a valve to control the flow of fluid through said conduit; and control means connected to said valve, said control means including a first electrical contact connected to one of said members for movement thereby, lever means normally operatively connected to the other of said members for movement thereby, a second electrical contact on a portion of said lever means in alignment with said first contact, said lever means being constructed and arranged so that the movement of one of said contacts is a predetermined percentage greater than the movement of the other of the contacts in response to a weight being placed on said platform, and means to open said valve and to disconnect said portion of said lever means from movement in response to movement of the other of said members, said contacts forming a part of an electrical circuit to close said valve when said contacts come together.

4. A meat pumping control apparatus to control meat pumping means for use with a scale having means movable in response to changes of weight on the scale load bearing means, said apparatus comprising a first electrical contact connected to said means, lever means normally operatively connected to said movable means, a second electrical contact on a portion of said lever means in alignment with said first contact, said lever means being constructed and arranged that the movement of one of said contacts is a predetermined percentage greater than the movement of the other contact in response to a weight being placed on said bearing means, said contacts being connected to said meat pumping means, and means to disconnect said portion of said lever means from movement in response to movement of the movable means.

5. A meat pumping control apparatus to control meat pumping means and for use with a scale having a first member movable in proportion to the weight on the scale load bearing means and a second member movable in proportion to the weight on the scale load bearing means, said apparatus comprising a first electrical contact connected to one of said members, lever means normally operatively connected to the other of said members, a second electrical contact on a portion of said lever means in alignment with said first contact, said lever means being constructed and arranged that the movement of one of said contacts is a predetermined percentage greater than the movement of the other contact in response to a weight being placed on said platform, said contacts being connected to said meat pumping means, and means to disconnect said portion of said lever means from movement in response to movement of the other of said members.

6. A meat pumping control apparatus to control meat pumping means for use with a scale having means movable in response to changes of weight on the scale load bearing means, said apparatus comprising a first electrical contact connected to said movable means, a pivotally mounted lever arm, a second electrical contact on said arm, said arm being positioned in alignment with said first contact with said second contact, lever means having a stop thereon and connected to said movable means for movement thereby, said arm normally being urged against said stop in a direction such that without said urging said stop will move out of contact with said arm upon an increase in weight on the scale load bearing means whereby said second contact will normally move in response to movement of said movable means, and means to arrest the movement of said arm whereby an increase in weight on said scale load bearing means will not result in movement of said second contact.

7. A meat pumping control apparatus to control meat pumping means and for use with a scale having a first member movable in a given direction in proportion to the weight on the scale load bearing means and a second member movable in proportion to the weight on the scale load bearing means, said apparatus comprising a first electrical contact connected to said first member, a pivotally mounted lever arm, a second electrical contact on said arm, said arm being positioned in alignment with said first contact with said second contact in said direction from said first contact, lever means having a stop thereon and connected to said second member for movement thereby, said arm normally being urged against said stop in a direction such that without said urging said stop will move out of contact with said arm upon an increase in weight on the scale load bearing means whereby said second contact will normally move in response to movement of said second member, and means to arrest the movement of said arm whereby an increase in weight on said load bearing means will not result in movement of said second contact.

8. A meat pumping control apparatus to control meat pumping means and for use with a scale having an automatic load counterbalancing mechanism, weight transfer means connecting the scale load bearing means and the counterbalancing mechanism with a portion of said transfer means being movable downwardly in response to an increase in weight on said bearing means, and a weight indicating means operatively connected to said counterbalancing mechanism and having a portion movable upwardly in response to an increase in weight on said bearing means, said apparatus comprising a pair of electrical contacts, lever means and a selective clamping means, one of said electrical contacts being attached to said portion of said transfer means and being positioned downwardly, said lever means comprising an arm member and a connecting member, the other of said contacts being attached to said arm member, said arm member being pivotally mounted with said other contact being positioned upwardly in alignment with said one contact, one of said members having a generally vertical elongated slot therein, the other of said members having a projection received in said slot, with the weight of said arm member normally holding said projection at one end of said slot, said clamping means being positioned to clamp said arm member and thereby arrest the movement of said arm member, said lever means being connected to said portion of said indicating means to move said second contact, when said arm is not clamped, in response to an increase in weight on said bearing means a distance that is a predetermined percentage greater than the distance moved by said first contact in response to the same increase in weight on said bearing means.

9. A meat pumping control apparatus to control meat pumping means for use with a scale having means movable in response to changes of weight on the scale load bearing means, said apparatus comprising a first electrical contact connected to said means, lever means normally operatively connected to said movable means, a second electrical contact on a portion of said lever means in alignment with said first contact, said lever means including a knife edge support, a balance arm having a bearing resting on said support, said lever means being constructed and arranged that the movement of one of said contacts is a predetermined percentage greater than the movement of the other contact in response to a weight being placed on said bearing means, said contacts being connected to said meat pumping means, and means to disconnect said portion of said lever means from movement in response to movement of the movable means, said support being pivotally mounted whereby the percentage of movement of said one contact with respect to the other contact may be varied.

No references cited.